US008592497B2

(12) United States Patent
Reese et al.

(10) Patent No.: US 8,592,497 B2
(45) Date of Patent: Nov. 26, 2013

(54) PROCESS FOR PREPARING POLYURETHANES

(75) Inventors: Hans-Juergen Reese, Damme (DE); Imbridt Murrar, Senftenberg (DE); Ralf Fritz, Bissendorf-Schledehausen (DE); Andres Cabrera, Osnabrueck (DE); Birgit Magg, Damme (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 432 days.

(21) Appl. No.: 12/296,287

(22) PCT Filed: Apr. 3, 2007

(86) PCT No.: PCT/EP2007/053216
§ 371 (c)(1),
(2), (4) Date: Oct. 7, 2008

(87) PCT Pub. No.: WO2007/115971
PCT Pub. Date: Oct. 18, 2007

(65) Prior Publication Data
US 2009/0253819 A1    Oct. 8, 2009

(30) Foreign Application Priority Data
Apr. 12, 2006   (EP) ..................................... 06112525

(51) Int. Cl.
*C08G 18/72*   (2006.01)
*C08J 9/00*    (2006.01)

(52) U.S. Cl.
USPC ........................................... 521/159; 528/67

(58) Field of Classification Search
None
See application file for complete search history.

(56) References Cited

U.S. PATENT DOCUMENTS

| 3,694,386 A | 9/1972 | Hoeschele |
| 4,613,687 A | 9/1986 | Knofel et al. |
| 4,774,357 A * | 9/1988 | Keggenhoff et al. ......... 560/352 |
| 2004/0106789 A1 * | 6/2004 | Richter et al. ............... 540/202 |
| 2005/0240054 A1 * | 10/2005 | Liman et al. ................ 560/347 |

FOREIGN PATENT DOCUMENTS

| DE | 1 932 832 | | 1/1970 |
| EP | 0 046 917 | | 3/1982 |
| EP | 0 294 110 | | 12/1988 |
| EP | 0294110 | * | 12/1988 |
| EP | 1 518874 B1 | * | 8/2004 |
| EP | 1 518 874 | | 3/2005 |
| JP | 10 158231 | | 6/1998 |
| WO | 2005 007721 | | 1/2005 |

* cited by examiner

*Primary Examiner* — Randy Gulakowski
*Assistant Examiner* — Jeffrey Washville
(74) *Attorney, Agent, or Firm* — Oblon, Spivak, McClelland, Maier & Neustadt, L.L.P.

(57) ABSTRACT

The invention relates to a process for the preparation of polyurethanes by reacting polyisocyanates a) with compounds having at least two hydrogen atoms reactive with isocyanate groups b), wherein a polyisocyanate a) used is at least one polyisocyanate ai) having an average functionality of greater than 2, a content of diisocyanates of not more than 2% by weight and a content of uretonimines of not more than 4% by weight, based in each case on the weight of the polyisocyanate ai).

26 Claims, No Drawings

PROCESS FOR PREPARING POLYURETHANES

The invention relates to a process for the preparation of polyurethanes by reacting polyisocyanates having a low uretonimine content with compounds having at least two hydrogen atoms reactive with isocyanate groups.

Polyurethanes have long been known and are widely described. They can be used in many technical areas. One-component foams from aerosol containers, also referred to as aerosol foams or assembly foams, and adhesives and sealing compounds constitute an important field of use of the polyurethanes.

In these fields of use, mixtures of diphenylmethane diisocyanate and polyphenylenepolymethylene polyisocyanates, frequently also referred to as crude MDI or polymer MDI, and/or reaction products of polyisocyanates with less than the stoichiometric amount of compounds having at least two hydrogen atoms reactive with isocyanate groups, so-called NCO prepolymers, are generally used as polyisocyanates.

In said applications, it is frequently required to reduce the content of breathable isocyanates in the reaction mixture.

With the use of prepolymers, this can be achieved by removing the unconverted monomeric isocyanates, for example by distillation, after the reaction.

In the case of polyurethanes for use in aerosol foams, polymer MDI is generally used as a polyisocyanate. This usually comprises a high proportion of dinuclear MDI. The aerosol or assembly foams are in particular one-component foams.

Aerosol foams are assembly means frequently used in the building industry and intended for the installation of windows and doors in structures and as filling material for cavities resulting from the building work or passages through masonry for pipe installations. Such an aerosol container comprises a prepolymer and blowing agents and additives. The desired foam forms by discharge of its content by means of a blowing agent, its foaming through evaporation of the blowing agent, the so-called froth effect, and by its curing with atmospheric humidity.

One-component foams based on NCO-containing prepolymers are the most well known foams of this type. These are different products which lead to rigid to flexible and resilient foams, depending on composition.

A disadvantage of all these formulations is that considerable amounts of monomeric isocyanates are present in these NCO-containing prepolymers, giving rise to a certain potential hazard due to breathable isocyanate during the foaming process. However, formulations having substantially reduced contents of free monomeric isocyanates are also known in this group of foams.

Thus, according to EP 1 518 874, it is known that an isocyanate having a low monomer content is used for the production of one-component foams, which is obtained from a defined polyphenylenepolymethylene polyisocyanate by removal of the monomeric isocyanate by distillation. By using this product, if appropriate as a mixture with diluents and further compounds containing isocyanate groups, one-component foams having a low monomer content are thus obtained. A disadvantage here is that one-component aerosol foams produced in this manner are not very storage-stable, with the result that the content of the pressurized aerosol container becomes solid within a few weeks and hence unusable.

Furthermore, WO 2005/007721 A1 describes the use of mixtures of prepolymers having NCO terminal groups and a low monomer content, i.e. reaction products of polyols and diphenylmethane diisocyanate in stoichiometric excess which had been freed from monomers, demonomerized polyphenylenepolymethylene polyisocyanate, trimerized hexamethylene diisocyanate and diluents. Disadvantageous here are the extremely high viscosities in starting materials for realizing the required reduced monomer content of isocyanate, which make the use technologically difficult, and the fact that the storage stability, as in the case of the solution according to EP 1 518 874, is not ensured.

It was an object of the invention to provide isocyanate components which have a low monomer content, are based on crude MDI and have improved storage stability and good processing properties.

The object could be achieved by the use of polyisocyanates having an average functionality of greater than 2, a content of diisocyanates of not more than 2% by weight and a content of uretonimines of not more than 4%, based in each case on the weight of the polyisocyanate.

The invention accordingly relates to a process for the preparation of polyurethanes by reacting polyisocyanates a) with compounds having at least two hydrogen atoms reactive with isocyanate groups b), wherein a polyisocyanate a) used is at least one polyisocyanate ai) having an average functionality of greater than 2, a content of diisocyanates of not more than 2% by weight and a content of uretonimines of not more than 4% by weight, based in each case on the weight of the polyisocyanate ai). The content of uretonimines in polymer MDI is determined by means of FT-IR analysis on the basis of a calibration with trinuclear uretonimine.

The invention relates to the use of the polyisocyanate mixture according to claims 10 and 11 for the preparation of polyurethanes, in particular of 1-component polyurethane spray foams, polyurethane adhesives and/or sealing compounds, polyurethane elastomers, 2-component polyurethane foams, in particular 2-component rigid polyurethane foams.

A mixture of diphenylmethane diisocyanate and polyphenylenepolymethylene polyisocyanates having a diphenylmethane diisocyanate content of not more than 2% by weight is preferably used as polyisocyanate aii).

The polyisocyanates ai) according to the invention can, depending on the field of use, be used alone or as a mixture with other polyisocyanates for the preparation of polyurethanes.

The polyisocyanates ai) according to the invention can be used in two-component systems and one-component systems. In the case of two-component systems, the compound having at least two hydrogen atoms reactive with isocyanate groups is reacted with a polyisocyanate to give the polyurethane.

In the case of one-component systems, an NCO-containing prepolymer is prepared from the polyisocyanate and less than the stoichiometric amount of the compounds having at least two hydrogen atoms reactive with isocyanate groups, which prepolymer, for example, as described above in the case of aerosol foams, cures with atmospheric humidity to give the polyurethane-polyurea. This embodiment is used in particular in the case of aerosol foams. In the case of one-component systems, the polyisocyanate ai) according to the invention is generally used as a mixture with other polyisocyanates, preferably prepolymers comprising isocyanate groups.

The polyisocyanates ai) are obtainable by removing the diphenylmethane diisocyanate and the uretonimine from a mixture of diphenylmethane diisocyanate and polyphenylenepolymethylene polyisocyanates, advantageously the uretonimine being removed first and only thereafter the diphenylmethane diisocyanate. The removal of the diphenylmethane diisocyanate from a mixture is described, for example, in EP 1 518 874. After the demonomerization process analogous to the teaching of EP 1 518 874, a product having an L* value of greater than 90 and a b* value of less than 70, determined according to DIN 6162 and DIN 6164, is obtained from the polyphenylenepolymethylene polyisocyanate mixture having a low uretonimine content.

As described, the mixture of diphenylmethane diisocyanate and polyphenylenepolymethylene polyisocyanates which is used for the preparation of the polyisocyanate ai) is first freed from secondary compounds, such as uretonimine. These are formed in the preparation and working-up, in particular by thermal loading of the polyisocyanates. These secondary compounds from the preparation process, such as uretdiones, uretonimines, carbamoyl chlorides, are present in the starting polyisocyanate in the maximum amount of 25% by weight. The removal is preferably effected by liquid-liquid extraction with polar or nonpolar solvents. In a particular embodiment, hydrocarbons, such as cyclohexane, are preferred. Such processes are described, for example, in DE 15 43 258 or EP 133 538.

In a preferred embodiment of the removal of the uretonimine, the polyphenylenepolymethylene polyisocyanate used, for example Lupranat®M grades from BASF, is brought into contact with cyclohexane in the isocyanate:solvent ratio of from 1:1 to 1:15, preferably from 1:1.5 to 1:12 and particularly preferably from 1:2.5 to 1:10 at a temperature of from 20 to 90° C. and preferably from 30 to 80° C. for from 1 to 180 min and preferably from 5 to 150 min. Thereafter, the product mixture is left to stand at from 20 to 40° C. and preferably at room temperature until phase formation is complete. The lower phase is the so-called "raffinate", which comprises the uretonimine to be separated off and MDI homologs having a larger number of nuclei. The upper phase is the so-called "extract", which comprises the desired polyphenylenepolymethylene polyisocyanate having a low uretonimine content and solvent. The two phases are separated and the solvent is removed completely by means of vacuum distillation. The residual content of cyclohexane is preferably less than 20 ppm.

The monomeric diisocyanate is then separated off from the mixture thus treated. The removal of the monomeric diisocyanate can preferably be effected by distillation, preferably under reduced pressure. It is preferable to carry out the distillation using a thin-film evaporator or short-path evaporator. Such a process is described, for example, in EP 1518874. The removal of the monomers is preferably carried out at a temperature of less than 160° C., particularly preferably from 100 to 158° C. and in particular from 120 to 155° C. The pressure is preferably from 0.001 to 10 mbar, particularly preferably from 0.01 to 1 mbar and in particular from 0.02 to 0.9 mbar.

In a preferred embodiment of the process according to the invention, the polymer MDI mixture used as starting material has the following composition:

| | |
|---|---|
| dinuclear MDI | 45.0 ± 25.0% |
| trinuclear MDI | 25.0 ± 10.0% |
| tetranuclear MDI | 10.5 ± 5.5% |
| ≥pentanuclear MDI homologs | 17.5 ± 15.5% |

The products according to the invention which are prepared from this starting material have a content of uretonimines of not more than 4% by weight, a content of dinuclear MDI of not more than 2% by weight, a content of trinuclear MDI of from 25 to 65% by weight, a content of tetranuclear MDI of from 5 to 45% by weight and a content of ≥pentanuclear MDI of from 1 to 40% by weight and an average functionality of from 2.2 to 5.2. The viscosity of the polyphenylenepolymethylene polyisocyanates according to the invention which have a low uretonimine and monomer MDI content is preferably less than 7000 mPa·s at 25° C. and in particular from 500 to 5000 mPa·s at 25° C.

Polyisocyanates ai) prepared from this product are distinguished not only by their good storage stability but also, inter alia, by the fact that they have a comparatively very low natural color and, as polyisocyanates having a higher functionality, can advantageously be used as crosslinking agents, in particular in the 2-component polyurethane systems, particularly preferably in 2-component rigid PU foam systems.

The good storage stability of the isocyanate component produced according to the teaching according to the invention is ensured both for the 2-component applications and for use as an isocyanate component in 1-component applications, for example in a pressurized container in the case of 1-component aerosol foam.

As described, the polyisocyanates ai) according to the invention can be used alone or in combination with other polyisocyanates. Preferably, the polyisocyanates ai) are used as a mixture with other polyisocyanates.

In a preferred embodiment of the process according to the invention, at least one prepolymer aii) comprising urethane groups and isocyanate groups is used together with the polyisocyanate ai).

Such compounds and their preparation are known. They are usually prepared by reacting polyisocyanates with less than stoichiometric amounts of compounds having at least two hydrogen atoms reactive with isocyanate groups. Polyisocyanates which may be used are the customary and known di- and polyisocyanates. Toluylene diisocyanate (TDI), diphenylmethane diisocyanate (MDI), mixtures of diphenylmethane diisocyanate and polyphenylenepolymethylene polyisocyanates (crude MDI) and aliphatic diisocyanates, such as hexamethylene diisocyanate (HDI) and isophorone diisocyanate (IPDI), may be mentioned by way of example. MDI or crude MDI, in particular MDI, is particularly preferably used. In general, at least difunctional alcohols, preferably polyether alcohols, are used as compounds having at least two hydrogen atoms reactive with isocyanate groups. The polyether alcohols are particularly preferably difunctional to trifunctional and have a molecular weight in the range of from 100 to 6000 g/mol.

After the reaction, the unconverted diisocyanates are separated off from the reaction mixture. This is usually effected by distillation, whereby the distillation should be carried out in a thin-film or a short-path evaporator. Such processes are disclosed, for example, in DE 10 2004 038 784.

Since the viscosity of the polyisocyanates ai) and aii) and of the mixtures of these compounds is too high for many fields of use, it is preferable to add an inert diluent aiii) to the polyisocyanates. Suitable components aiii) are those compounds which are inert to the compounds used in the preparation of the polyurethanes. Suitable compounds are, for example, high-boiling solvents, plasticizers and flameproofing agents, for example diphenyl cresyl phosphate, dioctyl phthalate, dioctyl adipate, triethyl phosphate or trichloroalkyl phosphates. Flameproofing agents are used as plasticizers in particular in those applications in the end products of which flameproofing is required, for example in aerosol foam.

The ratio of the components ai), aii) and, if appropriate, aiii) to one another depends on the requirement which the end product has to meet.

In the case of aerosol foam, the isocyanate component preferably comprises from 20 to 65% by weight of the component ai), from 15 to 55% by weight of the component aii) and from 5 to 65% by weight of the component aiii). When used as a crosslinking agent, in particular for the preparation of rigid polyurethane foams, the isocyanate component preferably comprises from 20 to 96% by weight of the component ai), from 0 to 55% by weight of the component aii) and from 5 to 65% by weight of the component aiii). When used for the preparation of adhesives and sealing compounds, the isocyanate component preferably comprises from more than 0 to 45% by weight of the component ai), from 35 to 85% by weight of the component aii) and from 5 to 65% by weight of the component aiii).

The preparation of the polyurethanes with the use of the polyisocyanates according to the invention is effected by customary and known processes by reaction with compounds having at least two hydrogen atoms reactive with isocyanate groups. The known compounds customary for this purpose, in particular polyether alcohols, polyester alcohols, polyether ester alcohols and polyether amines, can be used as compounds having at least two hydrogen atoms reactive with isocyanate groups.

In the case of the 2-component processes, the mixtures of ai) and, if appropriate, aii) and aiii), if appropriate as a mixture with further polyisocyanates, are reacted with compounds having at least two hydrogen atoms reactive with isocyanate groups to give the polyurethane. Compact polyurethane reaction resins, known as polyurethane casting resins, or, with the use of blowing agents, rigid polyurethane foams can be prepared by this process. Preferably, polyether alcohols and/or polyester alcohols having a functionality of at least 3 and a hydroxyl number in the range of from 100 to 700 mg KOH/g are used as compounds having at least two hydrogen atoms reactive with isocyanate groups.

In the preparation of rigid foams, in addition to the component ai), further non-demonomerized mixtures of dinuclear and polynuclear MDI can also be used for adjusting the viscosity and functionality of the polyisocyanate component. This is tolerable in such applications. In addition to component ai), it is also possible to use prepolymers, preferably those having a functionality of greater than 2, in particular 3 or higher.

The 1-component processes are used in particular in the preparation of aerosol foams. Here, the polyisocyanates are reacted with less than the stoichiometric amount of compounds having two hydrogen atoms reactive with isocyanate groups to give a prepolymer and the prepolymer thus formed is filled with a blowing agent into a pressurized container. For this purpose, further compounds having at least two hydrogen atoms reactive with isocyanate groups are metered so that a prepolymer having a lower content of free isocyanate groups forms in the pressurized container.

By the use of the polyisocyanates ai) according to the invention, storage-stable polyisocyanate mixtures which have a low content of volatile diisocyanates and can also be used in storage-stable 1-component PU aerosol foams can be provided.

The polyisocyanates ai) are lighter and have a lower viscosity than those products which were not subjected to extraction. Starting from a polymer MDI (Lupranat®M200) having an iodine color number of 20, an L* value of 85.6 and a b* value of 70.1, a polymer MDI having an iodine color number of 0.8, an L* value of 99.3 and a b* value of 5.1 is obtained after the extractive removal of uretonimines and other secondary compounds.

The invention is to be described in more detail with reference to the examples below.

WORKING EXAMPLE 1

Production of an NCO-Functionalized Reaction Product of Diphenylmethane Diisocyanate And an OH-Functional Compound (Starting Material aii)

In a reactor, 4,4'-MDI and a polypropylene glycol mixture having an average molar mass of 900 were reacted under inert conditions in a molar ratio of 4.6 to 1 at 65° C. After subsequent reaction for 1 hour at 65° C., a prepolymer product having an NCO content of 15.5% by weight, a viscosity of 1963 mPa·s at 25° C. and 312 mPa·s at 50° C. and a monomer MDI content of 47.6% was obtained. This prepolymer was demonomerized in a two-stage distillation process at 0.17 mbar and 190° C. as well as 0.03 mbar and 168° C. The resulting MDI prepolymer having a low monomer content had an NCO content of 5.8% by weight, a viscosity of 5973 mPa·s at 50° C. and a monomer MDI content of less than 0.1%.

WORKING EXAMPLE 2

Production of a Demonomerized Polyphenylenepolymethylene Polyisocyanate Having a Low Uretonimine Content (Starting Material ai)

A polyphenylenepolymethylene polyisocyanate (BASF: Lupranat® M20) having a monomer MDI content of 37%, an NCO content of 31.2% by weight, a viscosity of 213 mPa·s at 25° C., a uretonimine content of 8.4%, an iodine color number of 20.6, an L* value of 85.0 and a b* value of 70.3 was extracted with cyclohexane in a one-stage extraction process, as described in the method below. Polyphenylenepolymethylene polyisocyanate (BASF: Lupranat® M20) was brought into contact with cyclohexane in the isocyanate:solvent ratio of 1:3 at 50° C. for 60 min. Thereafter, the product mixture was left to stand at room temperature until phase formation was complete. The lower phase was the so-called "raffinate", which comprised the uretonimine to be separated off and MDI homologs having a larger number of nuclei. The upper phase was the so-called "extract", which comprised the desired polyphenylenepolymethylene polyisocyanate having a low uretonimine content and solvent. The two phases were separated and the solvent was completely removed by means of vacuum distillation (residual content of cyclohexane less than 20 ppm). After the removal of the extracting agent by distillation, a polyphenylenepolymethylene polyisocyanate (PMDI) having a low uretonimine content and an NCO content of 33.0% by weight, a viscosity of 30 mPa·s at 25° C., an iodine color number of 0.3, an L* value of 99.8 and a b* value of 1.8 was obtained.

After subsequent demonomerization in a one-stage short-path evaporator apparatus, a polyphenylenepolymethylene polyisocyanate (PMDI) having a low monomer MDI and uretonimine content, with an NCO content of 32.2% by weight, a viscosity of 1258 mPa·s at 25° C., a monomer MDI content of 424 ppm, a uretonimine content of 2.2%, an iodine color number of 1.6, an L* value of 98.1 and a b* value of 9.7 was obtained.

TABLE stability of the polyphenylenepolymethylene polyisocyanate having a low uretonimine
and monomer MDI content compared with a polyphenylenepolymethylene polyisocyanate
having only a low MMDI content (comparative example)

|  | Comparative example | | | PMDI according to working example 2 (ai) | | |
| --- | --- | --- | --- | --- | --- | --- |
|  | initial | after 2 weeks at 40° C. | relative change | initial | after 2 weeks at 40° C. | relative change |
| MMDI content | 2669 ppm | 4226 ppm | +58% | 1451 ppm | 1873 ppm | +29% |
| Viscosity (25° C.) | 30 882 mPa·s | 66 880 mPa·s | +117% | 2865 mPa·s | 3939 mPa·s | +37% |
| NCO content | 29.9% by wt. | 29.5% by wt. | −1% | 31.6% by wt. | 31.5% by wt. | −0.3% |

WORKING EXAMPLE 3

Production of Isocyanate Components for
One-Component and Two-Component Pu Systems 3.1 Isocyanate component for one-component PU aerosol foams An isocyanate component was prepared from 165 g of the monomer-free MDI prepolymer according to working example 1, 225 g of the polyphenylenepolymethylene polyisocyanate having a low uretonimine content and low monomer MDI content, according to working example 2, and 110 g of triethyl phosphate. Said isocyanate component has the following properties: isocyanate content: 16.2% by weight of NCO; viscosity at 25° C.: 150 mPa·s 3.2 Isocyanate component for two-component rigid PU foams and PU casting resins An isocyanate component was prepared from 425 g of the polyphenylenepolymethylene polyisocyanate having a low uretonimine content and low monomer MDI content, according to working example 2, and 75 g of triethyl phosphate by mixing. Said isocyanate component has the following properties: isocyanate content: 27.2% by weight of NCO; viscosity at 25° C.: 98 mPa·s

WORKING EXAMPLE 4

Preparation of a One-Component PU Aerosol Foam

Production of the Polyol Component

A polyol component was produced from 306 g of a polyether polyol based on glycerol/propylene oxide/ethylene oxide (OH number 42 mg KOH/g), 185 g of a polyetherpolyol based on glycerol/propylene oxide (OH number: 155 mg KOH/g), 60 g of a brominated polyetherpolyol having an OH number of 330 mg KOH/g (trade name IXOL B251 from Solvay Fluor & Derivate, Hanover), 25 g of a silicone foam stabilizer (trade name Tegostab B 2219 from Goldschmidt), 8 g of dimorpholinodiethyl ether, 330 g of trichloropropyl phosphate, 0.5 g of low-viscosity liquid paraffin and 0.3 g of silicone oil M100 from Bayer.

Isocyanate Component

The isocyanate component according to working example 3.1 was used for this purpose.

Production of the Aerosol Can 171 g of the polyol component and thereafter 428 g of the isocyanate component were weighed into a 1 liter aerosol can and the aerosol can was sealed with a valve.

57 g of dimethyl ether, 38 g of a 4 bar propane/butane mixture (90% of propane and 10% of butane) and 95 g of tetrafluoromethane were then metered into the aerosol can through the valve.

The content of the can was homogenized by shaking, the prepolymer reaction being started thereby. After storing for 24 h at 50° C. (alternatively storage for 4 days at room temperature), the prepolymer reaction had taken place to such an extent that the 1-component PU aerosol foam could be processed.

Preparation of the Foam

By opening the valve of the aerosol can, the content was discharged in the form of a foam strand onto moistened paper. The foam had become non-tacky after about 9 min, could be cut after about 20 min and cured within about 8 h to give a foam which had the following properties:

| Foam property | Foam according to working example 4 | Comparative foam (about the same hardness) (prepared with commercial PMDI) |
| --- | --- | --- |
| Tensile strength [N/cm²] | 10 | 8 |
| Elongation [%] | 35 | 30 |
| Compressive stress (at 10% deformation) [N/cm²] | 8 | 5 |
| Shrinkage [%] | −3.6 | −4 |

WORKING EXAMPLE 5

Preparation of a Two-Component Rigid PU Foam

Production of the Polyol Component

A polyol mixture was prepared from 377 g of Lupranol 3424 (polyetherpolyol based on sucrose, pentaerythritol, diethylene glycol and propylene oxide, having an OH number of 403 mg KOH/g), 230 g of Lupranol 3423 (polyetherpolyol based on sucrose, glycerol and propylene oxide, having an OH number of 490 mg KOH/g), 20 g of glycerol, 300 g of Lupranol 1100 (polyetherpolyol based on propylene glycol and propylene oxide, having an OH number of 104 mg KOH/g), 54 g of Lupranol VP9319 (polyetherpolyol based on trimethylolpropane and propylene oxide, having an OH number of 160 mg KOH/g), 10 g of Tegostab B8443 stabilizer, 5 g of Niax Silicone SR 393 stabilizer and 4.5 g of water. Both 34 g of a catalyst mixture (23.3% of N,N-dimethylcyclohexylamine, 18.7% of 1-methylimidazole, 28% of tetramethylhexanediamine and 30% of Lupranol 1200 [polyetherpolyol based on propylene glycol and propylene oxide, having an OH number of 248 mg KOH/g]) and 50 g of an aqueous glycerol/glycol mixture (comprising 9% of glycerol and 31% of dipropylene glycol) were added to this mixture and the polyol component was produced therefrom.

Isocyanate Component

The isocyanate component according to working example 3.2 was used for this purpose.

Processing of the Components to Give Rigid PU Foam

The components were mixed in the mixing ratio of polyol component:isocyanate component=100:164 and a white rigid foam was obtained after foaming and curing. The foam (produced by free-rise foaming) had the following properties:

| | |
|---|---|
| Cream time: | 15 sec |
| Fiber time: | 46 sec |
| Rise time: | 84 sec |
| Density: | 43 kg/m$^3$ |
| Compressive strength: | 32 N/cm$^2$ |

WORKING EXAMPLE 6

Preparation of a Two-Component PU Casting Resin

Production of the Polyol Component

A polyol component was prepared from 730 g of a polyol customary in fat chemistry and based on soybean oil, having a functionality of 3.5 and a hydroxyl number of 170 mg KOH/g (trade name Sovermol 805), 200 g of a polyol customary in fat chemistry and based on soybean oil, having a functionality of 2.1 and a hydroxyl number of 227 mg KOH/g (trade name Sovermol 1102), 70 g of a zeolite drying agent based on the sodium aluminosilicate, 50% strength in castor oil, and 0.5 g of a silicone antifoam.

Isocyanate Component 1

The isocyanate component according to working example 3.2 was used for this purpose.

Isocyanate Component 2 (Comparative Component)

The commercially available polymer MDI known to date was used for comparative purposes.

The system components were reacted with the same degree of crosslinking (113%).

Comparison of mechanical properties obtained:

| Mechanical properties | Working example 6 (use of the isocyanate component 1 according to the invention) | Comparative example (use of the commercially available isocyanate component 2) |
|---|---|---|
| Hardness [° Shore D] | 55 | 57 |
| Tensile strength [N/mm$^2$] | 22.5 | 24.6 |
| Elongation at break [%] | 39 | 31 |
| Tear propagation resistance [N/mm] | 102 | 51 |

We claim:

1. A process for the preparation of a polyurethane, the process comprising:
   (A) removing uretonimines from a mixture comprising diphenylmethane diisocyanate and polyphenylenepolymethylene polyisocyanates ai) until a content of the uretonimines is not more than 4% by weight, thereby obtaining a polyisocyanate a); and
   (C) reacting the polyisocyanate a) with one or more compounds having at least two hydrogen atoms reactive with an isocyanate group b), wherein the polyisocyanate a) is at least one mixture of diphenylmethane diisocyanate and polyphenylenepolymethylene polyisocyanates ai)
   having an average functionality of from 2.2 to 5.2,
   a content of dinuclear MDI of not more than 2% by weight,
   a content of trinuclear MDI of from 25 to 65% by weight,
   a content of tetranuclear MDI of from 5 to 45% by weight,
   a content of ≥pentanuclear MDI of from 1 to 17.5% by weight, and
   a content of uretonimines of not more than 4% by weight, based in each case on a weight of the polyisocyanate ai), and
wherein the polyisocyanate a) has a viscosity of 1258 to 7000 mPa·s at 25° C.

2. The process of claim 1, wherein the polyisocyanate ai) is prepared by a process comprising:
   extracting a composition comprising a diisocyanate and polyisocyanates, the composition having an average functionality of greater than 2, to obtain an extract; and then
   freeing the extract of diisocyanates by distillation.

3. The process of claim 1, wherein the polyisocyanate ai) is prepared by a process comprising:
   extracting a composition comprising diphenylmethane diisocyanate and polyphenylenepolymethylene polyisocyanates, the composition having an average functionality of greater than 2, to obtain an extract; and then
   freeing the extract of diphenylmethane diisocyanate by distillation.

4. The process of claim 1, wherein the polyisocyanate a) further comprises at least one additional polyisocyanate.

5. The process of claim 1, wherein the polyisocyanate a) further comprises at least one prepolymer aii) comprising isocyanate groups and urethane groups.

6. The process of claim 1, wherein the polyisocyanate consists of the diphenylmethane diisocyanate and polyphenylenepolymethylene polyisocyanates ai).

7. The process of claim 5, wherein the prepolymer aii) is prepared by reacting at least one polyisocyanate with less than a stoichiometric amount of at least one compound comprising at least two hydrogen atoms reactive with an isocyanate group.

8. The process of claim 5, wherein the prepolymer aii) has a content of unconverted monomeric isocyanates of not more than 1% by weight, based on a weight of the prepolymer aii).

9. A polyisocyanate mixture, consisting of:
   diphenylmethane diisocyanate; and
   polyphenylenepolymethylene polyisocyanates,
   wherein the mixture has
   (i) a content of dinuclear MDI of not more than 2% by weight,
   (ii) a content of trinuclear MDI of from 25 to 65% by weight,
   (iii) a content of tetranuclear MDI of from 5 to 45% by weight,
   (iv) a content of ≥pentanuclear MDI of from 1 to 17.5% by weight, and
   (v) a content of uretonimines of not more than 4% by weight, based in each case on a weight of the polyisocyanate mixture,
   (vi) a viscosity of 1258 to 7000 mPa·s at 25° C., and
   (vii) an average functionality of from 2.2 to 5.2.

10. A polyurethane, prepared from the polyisocyanate mixture of claim 9.

11. A 1-component polyurethane spray foam, prepared from the polyisocyanate mixture of claim 9.

12. A polyurethane adhesive and/or sealing compound, prepared from the polyisocyanate mixture of claim 9.

13. A polyurethane elastomer, prepared from the polyisocyanate mixture of claim 9.

14. A 2-component polyurethane foam, prepared from the polyisocyanate mixture of claim 9.

15. A 2-component rigid polyurethane foam, prepared from the polyisocyanate mixture of claim 9.

16. A polyisocyanate mixture, comprising:
   (1) at least one polyisocyanate ai) having
      (1a) an average functionality of from 2.2 to 5.2 and a viscosity 1258 to 7000 mPa·s at 25° C.,
      (1b) a content of dinuclear MDI of not more than 2% by weight,
      (1c) a content of trinuclear MDI of from 25 to 65% by weight,
      (1d) a content of tetranuclear MDI of from 5 to 45% by weight,
      (1e) a content of pentanuclear MDI of from 1 to 17.5% by weight, and
      (1f) a content of uretonimines of not more than 4% by weight, based in each case on the weight of the polyisocyanate ai), and
   (2) a prepolymer aii) comprising (2a) isocyanate groups and (2b) urethane groups and (2c) having a content of unconverted monomeric isocyanates of not more than 1% by weight, based on the weight of the prepolymer aii).

17. A polyurethane, prepared from the polyisocyanate mixture of claim 16.

18. A 1-component polyurethane spray foam, prepared from the polyisocyanate mixture of claim 16.

19. A polyurethane adhesive and/or sealing compound, prepared from the polyisocyanate mixture of claim 16.

20. A polyurethane elastomer, prepared from the polyisocyanate mixture of claim 16.

21. A 2-component polyurethane foam, prepared from the polyisocyanate mixture of claim 16.

22. A 2-component rigid polyurethane foam, prepared from the polyisocyanate mixture of claim 16.

23. The process of claim 1, further comprising:
   (B) removing diphenylmethane diisocyanate from the mixture of diphenylmethane diisocyanate and polyphenylenepolymethylene polyisocyanates ai),
   wherein the removing of the diphenylmethane diisocyanate occurs after the removing (A) and before the reacting (C).

24. The process of claim 1, wherein the viscosity is in a range of 1258 to 2865 mPa·s at 25° C.

25. The process of claim 9, wherein the viscosity is in a range of 1258 to 2865 mPa·s at 25° C.

26. The process of claim 16, wherein the viscosity is in a range of 1258 to 2865 mPa·s at 25° C.

* * * * *